Oct. 4, 1932.  F. V. BECKER  1,881,165
CALCULATING INSTRUMENT
Filed June 9. 1928     3 Sheets-Sheet 2
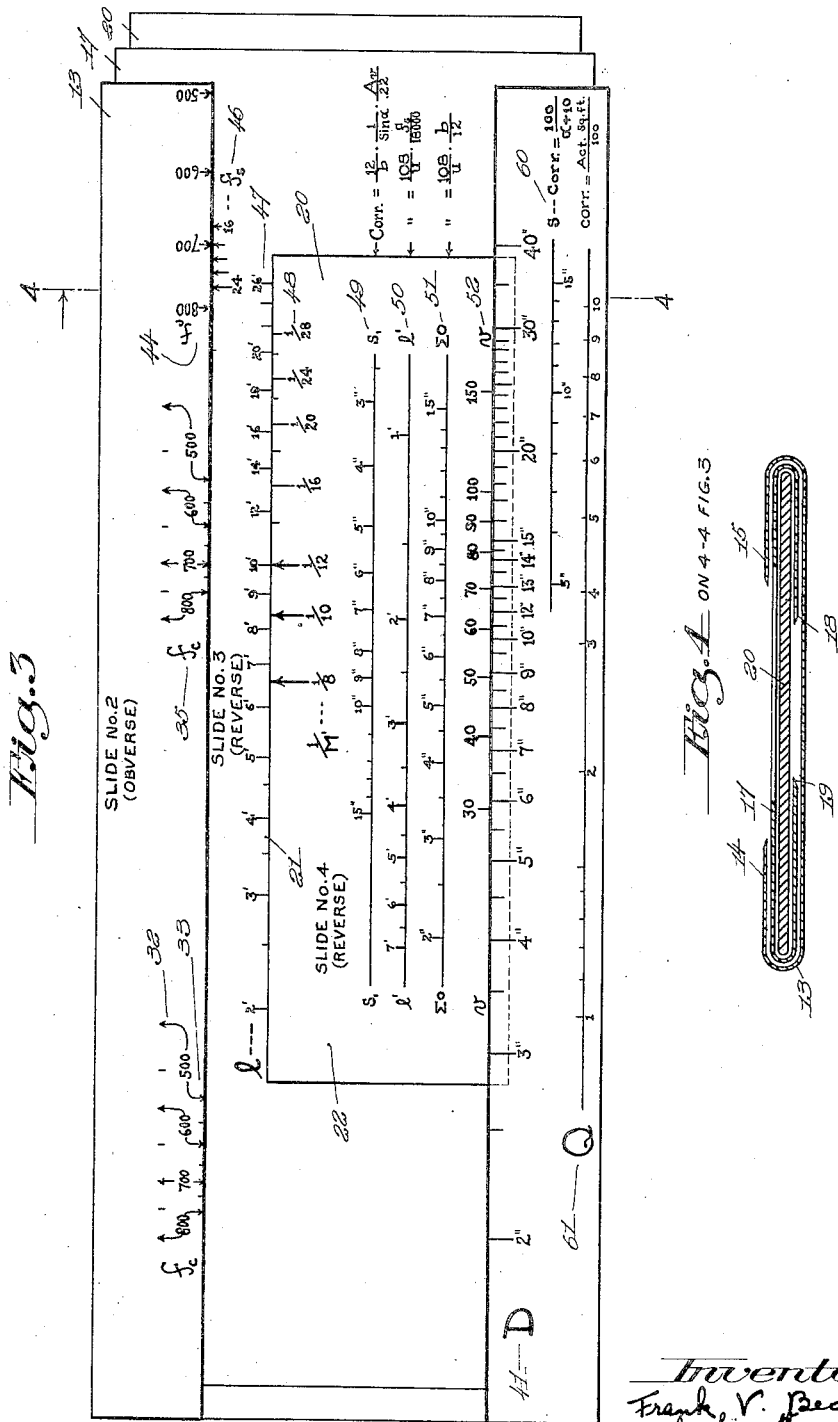

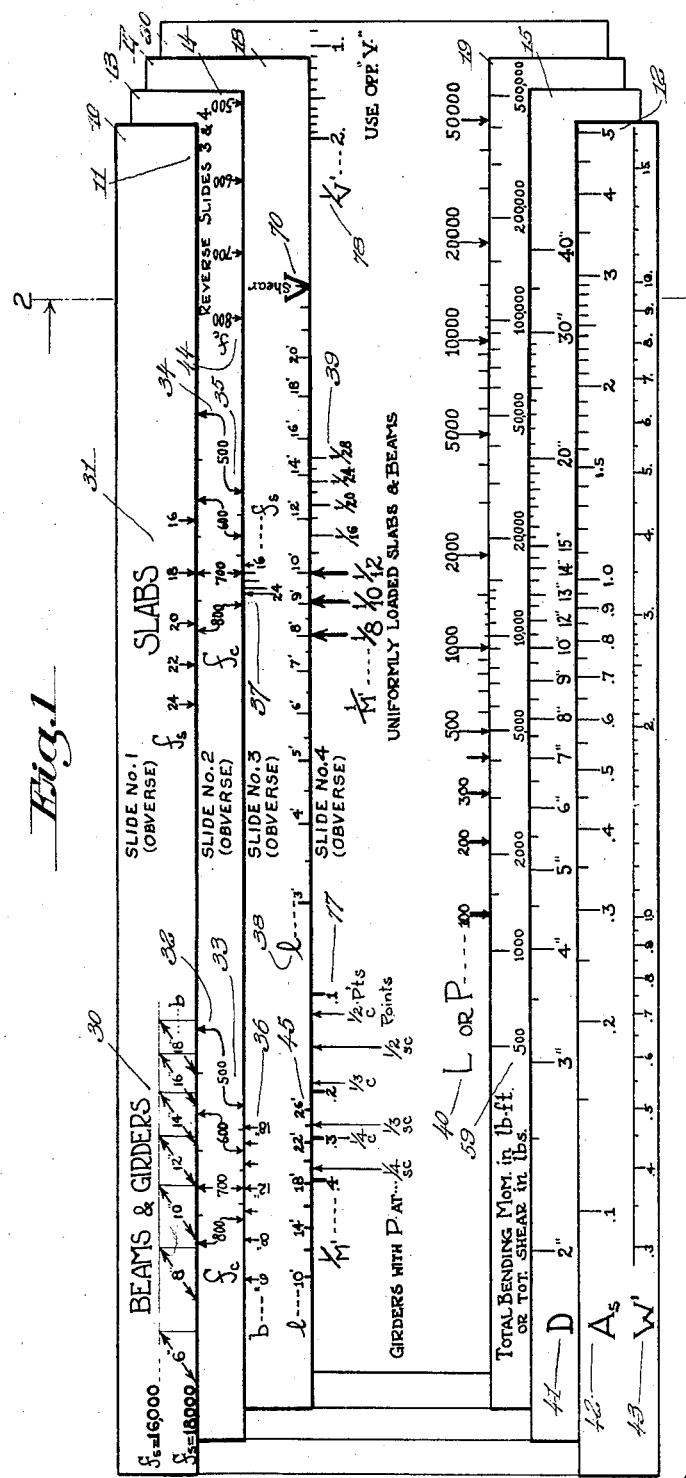

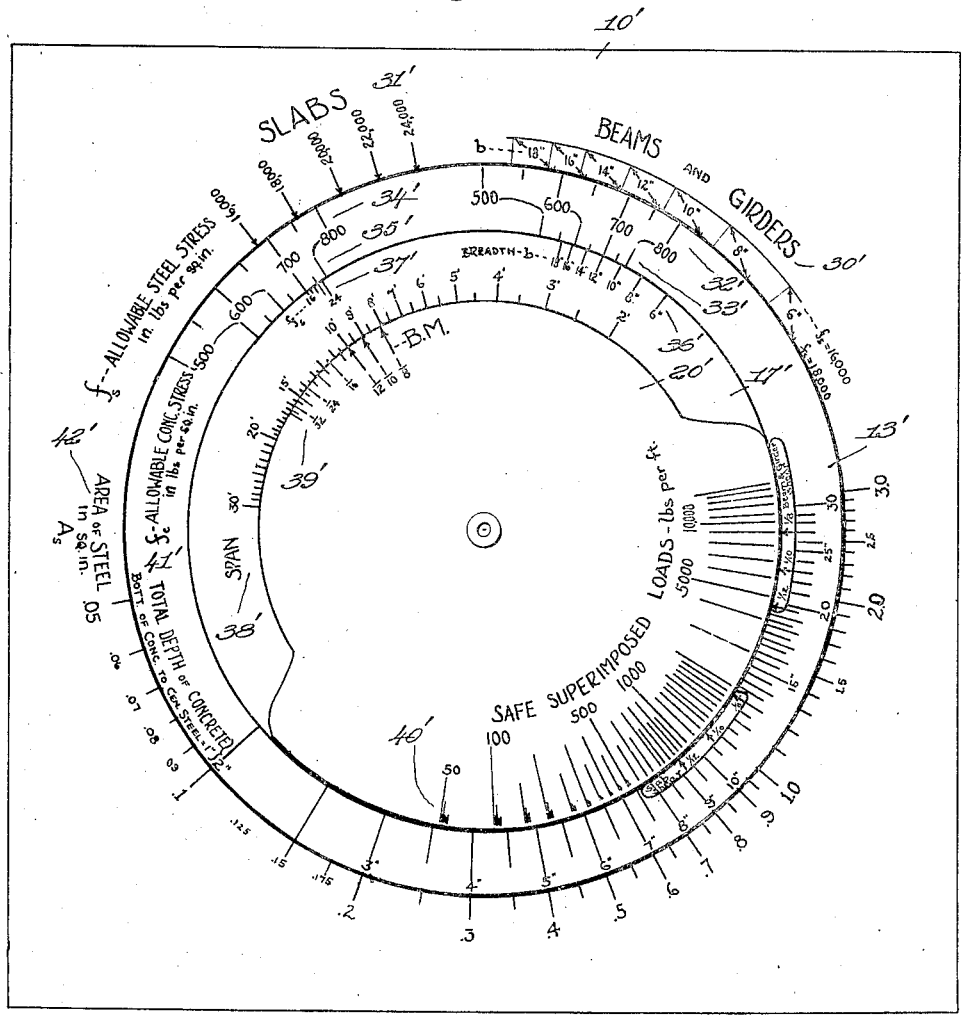

Patented Oct. 4, 1932

1,881,165

UNITED STATES PATENT OFFICE

FRANK V. BECKER, OF MALDEN, MASSACHUSETTS

CALCULATING INSTRUMENT

Application filed June 9, 1928. Serial No. 284,089.

The present invention relates to an improvement in calculating instruments for use in making computations for the design of reinforced concrete structures.

The joint committee of the American Society of Civil Engineers, the American Society for Testing Materials, and other societies and associations, have adopted formulæ and specifications for the computation of reinforced concrete structures. Pursuant to these formulæ and specifications there have been produced various computing instruments and tables for use in connection with them.

The object of the present invention is to produce a computing instrument for reinforced concrete structures by the use of which the work of computation for these structures is facilitated, and the invention consists in the instrument hereinafter described and particularly defined in the claims.

In the accompanying drawings illustrating the preferred form of the invention, Fig. 1 is a plan of the computing instrument; Fig. 2 is a section on line 2—2, Fig. 1; Fig. 3 is a plan similar to Fig. 1 with the outer slide removed and other parts reversed; Fig. 4 is a section on line 4—4, Fig. 2, of the instrument arranged as shown in Fig. 3; Fig. 5 is a plan of a modified form and Fig. 6 is an end view of the same.

The illustrated embodiment of the invention is described as follows:—The instrument consists of a plurality of over-lapping slides nested together. The outer slide 10 is, for convenience, called slide No. 1, and it has two scale lips 11 and 12. The second slide 13, known as slide No. 2, is similar to the first and fits within it. This slide is provided with two scale lips 14 and 15. The third slide 17, called slide No. 3, is similar in form to the first two slides. It has an upper scale lip 18 and a lower scale lip 19. The fourth slide 20, known as slide No. 4, is a plain strip and is provided with several surface scales. These slides may be made of any suitable material, but celluloid is preferred because of facility of forming it into the shapes desired at a small expense.

Referring now to Fig. 3 which is a plan view of the slide rule similar to that shown in Fig. 1 except that slide No. 1 is removed and slides No. 3 and No. 4 have been turned over and inserted within slides No. 2, it will be noted that a rectangular portion of slide No. 3 has been cut out. The upper edge 21 of the opening is the scale lip.

Slide No. 1, has on its scale lip 11 (Fig. 1) two sets of graduations 30 and 31, both of which are for allowable steel tensile stresses ($f_s$) [based on different breadths ($b$)], one set 30 for beams and girders, and the other set 31 for slabs ($b$ is assumed 12" for slabs). Slide No. 2 has on its upper scale lip 14 five sets of graduations 32, 33, 34, 35 and 44, all of which are for allowable concrete compressive stresses ($f_c$). Scales 32 and 33 have one set of amounts reading on both scales; similarly, the two scales 34 and 35 have one set of amounts reading on both scales. Scale 44 has one set of amounts. The upper scale lip 18 of slide No. 3 is provided with four sets of graduations, one set of graduations 36 reading in breadths ($b$) of beams and girders; the second set of graduations 37 reading in allowable steel stresses ($f_s$) similar to the graduations 31 on slide No. 1; the third set of graduations 38 reading in feet of span ($l$), and the fourth set of graduations 45 reading in feet of span ($l$). A single shear graduation 70 in the shape of a V is also provided. The upper graduations 39 of slide No. 4, read in bending moment coefficients $\left(\dfrac{1}{M'}\right)$; the graduations 77 are also in bending moment coefficients, with particular divisions marked off designating concentrated loading points of application; such as: ¼ points, ⅓ points etc. This scale is double, the designations: $sc$ and $c$, accompanying these markings, mean semi-continuous and continuous spans respectively. Graduations 78 read in shear coefficients $\left(\dfrac{1}{V'}\right)$. Slide No. 4 is also provided with graduations 40 reading in safe superimposed (or live) loads (L) in pounds per lineal foot of beam and in pounds per square foot of slabs and also in safe superimposed loads (P) in pounds of concentrated loads.

The lower scale lip 19 of slide No. 3 has graduations 59 which read in total bending moments (M) in lb.—ft. or in total shear (V) in lbs. The lower scale lip 15 of slide No. 2 has graduations 41 in inches indicating total depth of concrete (D) including an arbitrary distance of 1 inch from center of the reinforcement to the bottom of a slab and 2 inches to the bottom of beam or girder. The scale lip 12 of slide No. 1 has graduations 42 in terms of square inches of steel reinforcement ($A_s$) for the width of beam, girder or slab assumed. A second scale 43 is applied to the scale lip 12 of slide No. 1, the graduations of which are so positioned with relation to the $A_s$ graduations as to represent the weight ($W'$) of steel per lineal foot of the member (of breadth $b$) being considered—for any $A_s$ reading.

Looking again at Fig. 3, graduated scales 46, 47, 48, 49, 50, 51, 52, 60 and 61 are seen. The graduated divisions of scale 46 on the back of slide No. 3 are in terms of allowable steel stresses ($f_s$) and read with relation to scale 44 on the upper scale lip of slide No. 2. Scale lip 21 bears scale 47 with graduations reading in feet of span ($l$). Graduations 48 on the reverse surface 22 of slide No. 4 are in bending moment coefficients and read with relation to the span scale 47. Also on the reverse surface 22 of slide No. 4 are graduations:

49 reading in actual (web reinforcement) stirrup and bent bar spacings ($s_1$), 50 reading in length ($l'$) of main tensile steel required for bond, 51 reading in sum of perimeters ($\Sigma_o$) of main reinforcing bars at the critical sections, and 52 reading in unit shearing stresses ($v$) on concrete and steel, all reading with respect to each other and with respect to the total depths (D); viz. graduations 41 on slide No. 2. The lower portion of scale lip 15 of slide No. 2 also has graduations 61 which are in cu. yds. of concrete (Q) per 100 sq. ft. of horizontal surface area; and graduations 60 in terms of maximum web reinforcement (stirrup and bar) spacings ($s$).

In using this instrument for designing or investigating designs of reinforced concrete structures; such as beams, girders or slabs, the series of scales above referred to are graduated to indicate variables concerned in the calculation. (The scales may be extended as desired). They are listed for reference as follows:—

(1) $f_s$ = Tensile unit working stress in steel in lbs. per sq. in.

(2) $f_c$ = Compressive unit working stress in concrete in lbs. per sq. in.

(3) $b$ = Breadth of beam or girder in inches (for slabs $b = 12''$).

(4) $l$ = Span of beam, girder or slab in feet.

(5) $\frac{1}{M'}$ = Bending moment coefficient.

(6) $L$ = Safe superimposed (or live) load in lbs. per lin. ft. of beam and in lbs. per sq. ft. of slabs.

(7) $D$ = Total depth of concrete in inches (based on a distance of $1''$ from the bottom of concrete to center of embedded metal of slabs and $2''$ to bottom of beam or girder.)

(8) $A_s$ = Total area of steel reinforcement in sq. in. per $b$ inches of width of beam, girder or slab.

(9) $W'$ = Weight (in lbs. per lin. ft.) of the steel of area $A_s$

(10) $M$ = Bending moment in lb.—ft. (including moment due to dead weight of member).

(11) $s$ = Maximum allowable horizontal spacing of web reinforcing members.

(12) $s_1$ = Actual horizontal spacing of web reinforcing members.

(13) $l'$ = Minimum length of embedment, of main bars, for bond.

(14) $\Sigma_o$ = Sum of perimeters of bars in one set.

(15) $v$ = Allowable unit shearing stress on the concrete and steel.

(16) $Q$ = Number of cu. yds. of concrete per 100 sq. ft. of horizontal surface area.

Other variables not above enumerated and concerned in the present concrete designs are functions of some of the variables listed. If any six of the first eight listed variables are given (or assumed), the other ten unknowns are determinate on the instrument. For example, if the entire upper surface of the slide rule is in view—as shown in Fig. 1—one movement on setting of each of the three inner slides (Nos. 2, 3, and 4) will enable the user to read directly and with an accuracy that is within practical limitations, four of the unknowns; and, when the surfaces of the slides are positioned as depicted in Fig. 3— one movement or setting of each of the two inner slides (Nos. 3 and 4) will give the values of $v$, $\Sigma o$, $l'$, and $s_1$ for the selected depth as previously determined, and when the entire bottom lip 15 of slide No. 2 is exposed (as in this Fig. 3), the values Q and $s$ may be read.

The instrument is based upon the following formulæ for rectangular beams and slabs, uniformly loaded and reinforced for tension as specified by the joint committee and is adaptable to any other classifications of designs or investigations (such as T-beams, footings, etc.) where any of these formulæ apply. Use has also been made of the "Theorem of three moments."

$$d^2 = \frac{2M}{f_c jkb} \tag{1}$$

or $d^2 = \dfrac{M}{f_s p b j}$ ------------------(2)

and $A_s = p b d$ ------------------(3)

$v = \dfrac{V}{b j d}$ ------------------(4)

$u = \dfrac{V}{\Sigma o j d}$ ------------------(5)

$s = \dfrac{45 d}{\alpha + 10}$ ------------------(6)

$v = 0.02 f'_c + \dfrac{f_v A_v}{b s_1 \sin \alpha}$ ------------------(7)

In these formulæ, $d$ = Depth from top of concrete to center of steel in inches.

$p$ = Steel ratio $\left(= \dfrac{A_s}{bd}\right)$ or, when multiplied by 100 it equals the percentage of steel in area $b \times d$.

$j$ = Ratio of lever arm of resisting couple to depth $d$.

$k$ = Ratio of depth of neutral axis to depth $d$.

$v$ = Allowable unit shearing stress on the concrete and steel.

$V = \frac{1}{2} w l$ = total vertical shearing stress on the concrete and steel for uniform loads and, $\left(\dfrac{1}{V'}\right) P$ for concentrated loads—where, $\dfrac{1}{V'}$ = the total shear coefficient (later referred to).

$u$ = Bond stress per unit of area of longitudinal surface of bar.

$\Sigma o$ = Sum of perimeters of bars in one set.

$M$ = Bending moment = $\left(\dfrac{w l^2}{M'}\right) \times 12$ in lb.-inches—where $\dfrac{1}{M'}$ is the bending moment coefficient depending upon whether span is "simple," "semi-continuous," "continuous," etc. i. e. $\frac{1}{8}$, $\frac{1}{10}$, $\frac{1}{12}$—etc.; also upon section of beam considered, number of spans, load concentration, etc.

$w$ = Total load; on slabs—in lbs. per square foot; on beams—in lbs. per lineal ft.

$w$ = Superimposed load per ft. plus wt. of beam (or slab) per ft. and $$p = \dfrac{1}{2} \cdot \dfrac{1}{\dfrac{f_s}{f_c}\left(\dfrac{f_s}{n f_c} + 1\right)}$$

$$k = \sqrt{2 p n + (p n)^2} - p n.$$

where $n = \dfrac{E_s}{E_c}$ = Ratio of modulii of elasticities of steel to concrete.

Note:—$n = 15$ is the figure upon which the slide rule is based throughout.

$j = 1 - \dfrac{K}{3}$ $f'_c$ = Ultimate compressive strength of concrete at age of 28 days.

$\alpha$ = Angle between web bars and longitudinal bars.

$f_v$ = Tensile unit stress in web reinforcement.

$A_v$ = Total area of web reinforcement in tension within a distance $s^1$, or the total area of all bars bent up in any one plane.

It will be noticed that the formulæ are given in terms of total loads per lineal foot of beam (or per sq. ft. of a slab) and the slide rule gives superimposed (or live) loads per lin. ft. of beam (or per sq. ft. of slab.)

In general I have shown by mathematical derivation:—

(1) That the design formulæ listed above may be expressed with comparative simplicity and greater usefulness in terms of superimposed loads instead of in terms of total loads as shown; thereby eliminating the usual objectionable estimations and trial calculations of a member's dead weight in order to find the total load.

(2) That the new formulæ may be conveniently expressed in terms that are independent of $p$, $j$, and $k$.

(3) That without practical error the design for any breadths of a member may be ascertained by a simple multiplying factor which is independent of the variation in superimposed loads; in other words, that estimations of the dead weights of members which vary with different breadths, are unnecessary and therefore that different breadths may be represented by a regular slide rule logarithmic scale when superimposed loads are used.

(4) That without practical error, the design for any depths ($d$) of beams, girders or slabs may be ascertained by the use of a regular logarithmic slide rule scale moving in relation to the other necessary scales which embody the other variables concerned in reinforced concrete design and based on the use of superimposed loads (i. e. exclusive of the designed member's own dead weight) instead of on the use of total loads (which means so far as the superimposed and the dead loads are concerned); in other words, that the relative $d$ values for different concrete and steel stress conditions—other things remaining equal—are independent of the variation in values of the superimposed loads.

(5) That interpolations may be made on the slide rule for any bending moment coefficients $$\left(\dfrac{1}{M'}\right)$$

as given in the expressions:

$$M = \left(\dfrac{1}{M'}\right) w l^2, \quad \left(\dfrac{1}{M'}\right) P l, \quad \dfrac{1}{M'} P l^2,$$

etc. thereby making the slide rule valuable in the design or the investigation of a design, of members having end conditions of different restraints; also considering different sections, different numbers and length combinations of spans, different forms of concentrated loadings etc. (This also makes the rule valuable for flat slab designs and investigations). In addition, when the total bending moment or the bending moment coefficient is known, or assumed, the equivalent uniformly distributed superimposed load may be ascertained for any system of concentrated loading.

(6) That when the coefficients of P are known the total transverse shear for any section may be conveniently obtained on the slide rule.

(7) That when P—a superimposed concentrated load—is used in the bending moment or shear expression, the instrument automatically includes the bending moment and shear respectively at the section being considered—due to the dead load of a member.

(8) That, even though, the slide rule is based upon formulæ which give designs that cause the steel and the concrete to be stressed to their maximum allowable values, its use is not by any means restricted to these conditions, and it may be used with equal facility for the investigations of designs as well as the designs which employ any usual range or combinations of steel and concrete stress conditions.

(9) That, as a matter of safety in design, for uniform loads, the design controlled by the unit vertical shear which does not exceed the maximum allowable stress values that are based upon the diagonal tensile stresses, may also be indicated on the slide rule.

(10) That, the total perimeters of the reinforcement for uniform loads, which are controlled by the allowable bonding stress of the tensile steel used in the beam action, may be conveniently shown on the slide rule.

(11) That, if the total bending moment of a beam or girder is known—the depth, reinforcement etc. may be ascertained by use of the slide rule for any combination of breadth, $f_s$ and $f_c$ stress conditions. Hence, this makes the rule applicable for designs and investigations of members having any system of concentrated and uniform loadings. (Note: The law that has been used in calculating the total bending moment graduations is not strictly correct for wide variations of stresses and breadths. The slight error may be placed on the side of safety (and even corrected by the use of an additional slide). It is felt that the scale's great usefulness warrants its existance on the rule. It is, however, not to be supposed that the rest of the instrument is built up or based on any such discrepancy).

(12) That, the minimum allowable length of the main reinforcing steel that must be embedded in the concrete for bonding purpose, may be conveniently shown on the slide rule.

(13) That, the required web member—either stirrup or bent bar—spacings may be conveniently shown on the slide rule.

(14) That, the distance from the support, where web reinforcement is no longer necessary may be ascertained on the slide rule.

(15) That, for estimating purposes, the resulting quantities of concrete and steel for the design under consideration, may be conveniently included on the rule.

The result of being able to correctly represent superimposed loads, beam breadths and depths by sliding scales, moving in relation to other scales which contain the other necessary data pertaining to the design, is quite paradoxical when one scrutinizes the Equations (1) and (2), with object of finding such a mathematical possibility [inasmuch as the breadth and depth are functions of the total load ($w$)] but this discovery is the foundation upon which the making of the instrument is based.

General theory and directions

In making designs or investigations of the structural members that the present invention relates to, numerous different classifications of practical problems present themselves. For example, some are listed below under different cases and the method of their attack will be given later; thus, the scope of the instrument will be more fully appreciated.

Beams and slabs:—
Case
(1) Uniformly loaded.
(2) Uniformly loaded and having equal concentrated loads at symmetrical positions with respect to the center of the span.
(3) Uniformly loaded and having any system of concentrated loadings.
(4) Uniformly distributed loads on one or more of several unequal spans.
—etc.

Girders:—
(5) (Same as Case (2).)
(6) (Same as Case (3).)
—etc.

Further, we are also concerned with members having different degrees of continuity, different end restraints, different combinations of span lengths, different numbers of spans—etc., all of which cause the bending moment and total (transverse) shear coefficients to have different values; for example, the BM coefficients of $Pl^2$ and the total shear coefficients of P as determined by the well known "Theorem of three moments."

Depending upon the economy consideration of the concrete and steel, the combination of the selected concrete compressive stresses ($f_c$) and of the selected steel tensile stresses ($f_s$) is important. The joint committee design formulæ given above are based upon the condition that the concrete and the steel will each be stressed to its maximum working stress. This condition, however, is not always possible to attain, due to given restricted dimensions of members, due to practical reasons. Further, on account of standard wood form sizes and commercial stock steel sizes, the most economical combination of the stresses should be selected to conform with the problem at hand. The adaptability of the slide rule readily lends itself to these considerations.

As is well known, below certain loads—all things taken into consideration—the dimensions of a member are governed by formulæ (1) or (2) whereas, with loads in excess of this critical point the dimensions of the member will be determined by the unit vertical shear (formula (4)), which will keep the diagonal tensile stresses within safe limits. So it is that in every case where a doubt exists, the shearing stress must be investigated.

After the concrete dimensions, the requisite steel reinforcement area and shear have been found, the general design is still incomplete until it is determined that there is sufficient bond between the steel and the concrete, to prevent failure. The proper amount of steel (web reinforcement) in the form of stirrups or bent bars, for example, and the stirrup spacing must also be determined so that the allowable diagonal tension is not exceeded.

Regarding bond—the design is made by use of formula (5) where the value of the bond stress ($u$) is specified at certain percentages of the ultimate compressive stress ($f'_c$) of the concrete being used. Therefore, knowing the load, depth and the other factors given in the formula, the minimum requisite total perimeter of the reinforcing bars, for example, is determined and thus a proper bar combination is fixed. A sufficient length of each bar must also be embedded in the concrete to develop a good bond.

Regarding stirrup sizes and placing—the design is made by use of formula (7).

The foregoing computations are all that are required for the design or investigation of concrete structures comprising beams, slabs and girders.

The slide rule quickly gives all of the above information.

It is to be noted that the instrument is particularly adaptable to the design or investigation of flat slabs which is a much used system. Flat slab construction differs from the beam and girder system in that the weight of the slab and its loading are entirely sustained by columns. In the systems of flat slab design which make use of different coefficients of ($wl^2$) for different bending moment values, the present invention will give the desired design information as before.

Confining our attention now to the available information as shown in Fig. 1—if the values are given (or assumed) for any six of the first eight specifications given above, the instrument will give the correct answer for the other two.

This operation is performed by setting all the known (or assumed) values of the given conditions opposite each other in accordance with the scale arrangement of the rule. Then the unknown or sought factors will be found on the remaining scales; each factor being opposite one of the known (or assumed) values on the adjacent scale.

For example, assume that the following factors are known, $f_s$, $f_c$, $b$, $l$, $\frac{1}{M}$ and L or P; then beginning with $f_s$ on scale 31 or with $b$ corresponding to $f_s$ on scale 30, set the assumed $f_c$ by moving slide No. 2 until the two assumed values are opposite each other. If a beam or girder is under computation the left hand two scales 30 and 32 are used; if slabs are to be computed, then the graduations under that designation are set opposite each other.

Then in computing beams and girders, the breadth $b$ of scale 36 is set opposite the corresponding $f_c$; in computing slabs—$b$ being 12 inches—no other setting is required than to set the $f_s$ assumed of scale 37 opposite $f_c$ graduation assumed. This is done by moving slide No. 3 to the proper position with respect to slide No. 2. Thereupon the selected bending moment coefficient on slide No. 4 will be moved to correspond to the span under consideration. (When bending moment coefficients of ($Pl$) are used—as would be the case in the design of a girder with concentrated loads (P) at ½, ⅓ or ¼—etc. points of the span, use the span scale 45 and when bending moment coefficients of ($wl^2$) are used as in uniformly loaded beams and slabs, use the span scale 38). Thereupon the instrument is set for reading depth of concrete and area of steel on scales 41 and 42 against the safe uniformly distributed or concentrated superimposed loads selected on slide No. 4.

Having thus far determined the bending moment, the depth, and the area of reinforcement, the shear ($v$), the minimum allowable total perimeter ($\Sigma o$), the bonding ($l'$) and the web steel spacings ($s_1$) will next be found. This is performed by reversing slides Nos. 3 and 4 (taken as one unit) in slides Nos. 2 and 1 as shown in Fig. 3. The given $f_s$ value on scale 46 is set opposite the given $f_c$ value on scale 44; then the given bending moment coefficient value on scale 48 is set opposite the given span on scale 47. The instrument is now set to read opposite the previously determined depth on scale 41, the resulting end-shear $(v)$, the $\Sigma'o$, $l'$, and $s_1$. The noted correction must be made to the readings of $\Sigma o$, $l'$, and $s_1$ i. e. multiply the figure as read by the indicated fractions. Note that when $u=108$—(i. e., $f'_c=2150$ lbs. per sq. in. which is a commonly used grade of 1:2:4 concrete), $b=12''$ (i. e., for slabs; or beams of breadth$=12''$), $f_s=18,000$ (i. e., a common $f_s$ value), $\alpha=90°$—(i. e. for vertical stirrups, sin $90°=1$), and $A_v=0.22$—(i. e. for $\frac{3}{8}''$ stirrups)

no corrections need be made to any of the readings.

Now regarding the distance from the support where no further web reinforcement is required, it is obvious that this will be at the section where the total unit shear $(v)$ is taken entirely by the concrete. Assuming that the allowable unit shear on the concrete is 40 lbs. per sq. in., it only remains to determine the length of the span (which carries the given uniform load) at whose ends $v=40$. This may be done on the instrument as follows: Observe the total depth (D) reading opposite $v=40$; then, assuming that the previously determined end-shear $v=120$, set 120 opposite the observed D and read the required span opposite the given bending moment coefficient. The required distance from supports is therefore determinate. This may be easily checked by reversing slides Nos. 3 and 4 and setting the given $\frac{1}{M'}$ opposite the newly determined span and reading opposite the given live load, the previously observed depth where $v=40$. If $\left(\frac{1}{V'}\right)$ any total shear coefficient (of P) on scale 78 of slide No. 4 is set opposite the "V" graduation 70, the total shear (V) in lbs. may be read on scale 59 opposite P (on scale 40).

For estimating purposes, the utility of the W' scale 43 and the Q scale 61 is self-evident.

For the purpose of illustrating the mode of the use of the instrument, the following examples are given:

*Example 1,—Slab design, Case 1*

Design a reinforced concrete floor slab for the allowable conditions of max. working tensile stress in steel—$f_s=18,000$ lbs. per sq. in. max. working compressive stress in concrete $f_c=700$ lbs. per sq. in.

Span of slab—$l=10$ ft.

Bending moment—$M=\frac{1}{12}wl^2$.

Uniformly distributed safe live load$=450$ lbs. per sq. ft.

Depth of slab—required.
Area of steel—required.
Unit vertical shear—required.
$\Sigma o$—required.

*Solution:*—(See Fig. 1.) On slide No. 1 referring to "slabs" set 18,000 opposite 700 on slide No. 2 (upper scale of $f_c$). On slide No. 2 (lower $f_c$ scale) set 700 opposite $f_s=18,000$ on slide No. 3. On slide No. 3 (span scale 38) set 10 ft. opposite BM coefficient$=\frac{1}{12}$ on slide 4 and the rule is set to read directly the depth and area steel for any live load.

The instrument reads as follows:

for L $=450$ lbs. per sq. ft.
D $=7.3''$
and A$_s=.55$— whether shear or bond failure will control the design for the given live load and other conditions will now be investigated. Thus turning over slides Nos. 3 and 4 (taken as one unit) and inserting them within slides Nos. 2 and 1 such that the given $f_s$ and $f_c$ on scales 46 and 44 respectively, are opposed as shown in Fig. 3 and, the given $\frac{1}{M'}$ and $l$ on scales 48 and 47 respectively, are opposed as shown in Fig. 3 the instrument is set to read the resulting shear $(v)$, the minimum total perimeter $(\Sigma o)$ and the length for bond $(l')$ as follows: Opposite D$=7.3''$ the shear $(v)$ on scale 52 reads 40 lbs. per sq. in. This is nearly the limiting shear stress value that may be used on the concrete alone according to specifications that the maximum $v=.02 f'_c$ where $f'_c$ is the ultimate compressive stress of the concrete which, in this case is 2150 lbs. per sq. in. The design is therefore safe regarding shear.

Opposite D$=7.3''$ and $v=40$ the reading on the $\Sigma o$ scale is about 4.5'' and the correction $$\frac{108}{u} \times \frac{b'}{12} = \frac{108}{108} \times \frac{12}{12} = 1 \text{ in this case.}$$

Similarly, the reading $l'=3.1$ ft. Hence, a combination of bars will be chosen that have a total perimeter $(\Sigma o)$ of at least 4.5'' and of total area as determined above and embedded a length of at least 3 ft. at critical sections in order that the bond stress is within safe limits.

If expanded metal, woven wire, etc., is to be used for the reinforcement, a standard mesh of area .55 sq. in. per ft. of width will be chosen.

The design is now complete.

Without any resetting the same procedure is to be followed for any other uniformly distributed superimposed load.

*Example 2:—Beam design Case 1*

Assume, for demonstration, we desire to design a beam of breadth $b=16''$ and the allowable design conditions are $f_s=18,000$ lbs. per sq. in., $f_c=600$ lbs. per sq. in., span $l=10$ ft., B. M.$=\frac{1}{12}wl^2$.

Assume any number of uniformly distributed live loads.

*Solution.*—(Fig. 1 very nearly shows the setting.)

(1) Using the positions referring to "beams and girders" at $f_s=18,000$ lbs. per sq. in. set slide No. 2 with $f_c=600$ against that $f_s$, at $b=16''$ on the $f_s=18,000$ scale.

(2) Set slide No. 3 with $b=16''$ opposite $f_c=600$ (as shown) on slide No. 2.

(3) Set slide No. 4 with BM coefficient=1/12 opposite span=10 ft. (on slide No. 3).

The rule is now set to read the depth of beam and the required area of steel for any uniformly distributed load (which is to include any uniform superimposed load on the beam aside from its own weight). Suppose, for example, the specified live load is 4,000 lbs. per ft. Then on scale $D=19.5''$, opposite or in line with live load=4,000 and $D=19.5''$ (sic!) the required $A_s=1.57$ sq. in. Again it is pointed out that the bar combination for this area must be so chosen that there is sufficient area for bond in accordance with usual design practice.

We will next proceed to test the design for shear failure and then determine the minimum required perimeter of the bar set. When properly set the instrument reads as follows: $v=87$ lbs. per sq. in. If we assume the ultimate compressive strength of the concrete as 1850 lbs. per sq. in. (at the end of 28 days) then the allowable $v=.06 \times 1850=111$ lbs. per sq. in. when the proper steel anchorage and distribution is made. Hence, our design will be safe concerning shear.

$\Sigma o$ reads 9.6 and, making the proper correction:

$$\Sigma o = 9.6 \frac{.108}{.05 \times 1850} \cdot \frac{16}{12} = 14.9''.$$

This is a rather high value for $\Sigma o$ (the necessity of special anchorage is indicated) because the chosen design conditions are uneconomical (and the concrete has a low stress value) but sufficed for demonstration purposes.

$l'$ reads about 1.45 ft. and with the proper corrections:

$$= 1.45 \frac{.108}{.05 \times 1850} \cdot \frac{1}{1} = 1.7 \text{ ft.}$$

$s_1$ reads 5.05'' and, corrected, it $$= 5.05 \cdot \frac{12}{16} \cdot \frac{1}{1} \cdot \frac{.22}{.22} = 4''$$

at support assuming ⅜'' vertical stirrups.

Now the distance from the support where no stirrups are required is determined as previously explained. $S_1$ at this distance is read opposite the allowable $v$ on the concrete alone. Opposite any other $v$ value, $s_1$ may be read.

It will be observed that the very low loads on scale 40 are indicated by lines that get broader as the loads become smaller. This is clearly illustrated by the low load pennant-shaped markings as shown in Fig. 5. For a low superimposed load, $d$ has slightly different values for different moment coefficients whose values are higher than 1/12. Therefore, to obtain accuracy of reading the right hand side of the marking is correct for $$\frac{1}{M'} = \frac{1}{8};$$

the intermediate division (as shown in the pennant) for $$\frac{1}{M'} = \frac{1}{10};$$

and the left hand side of the marking for $$\frac{1}{M'} = \frac{1}{12}$$

So far we have only considered a balanced ratio of the $f_c$ and $f_s$ stresses; i. e. the ratio which allows the materials to be stressed to their maximum working stresses. As has been previously stated, this ratio is not always practical or economical. Suppose, for example, we are concerned with a uniform live load of 500 lbs. Referring to Fig. 1, it is seen that 500 is in line with $D=7.6$ and $A_s=.57$. But in practical building construction the concrete employed would vary in depth by half-inches. Consequently, a depth of concrete of 8 inches would be employed. This increases the strength of the structure, and it is therefore obvious that it is not necessary to use as heavy reinforcement of steel as .57, and the instrument indicates how this steel area may be diminished in this case. Thus, the 8 inch graduation on the depth of concrete scale 41 is a certain distance to the right of the 500 graduation on the load scale 40. By reading the area of steel on scale 42 an equal distance to the left below the 500 load graduation, a proper area of steel may be ascertained corresponding to the 8 inch depth of concrete, thereby ascertaining that with an 8 inch depth of concrete .55 may be employed. It is to be observed that if the 500 lb. load is exactly lined up with $D=8$ and $A_s=.55$—keeping $\frac{1}{12}$ opposite 10 ft.—the resulting decreased value of the concrete stress (due to the increase in depth) may be read opposite the $f_s$ or $b$ graduations. Likewise, a 9 inch depth and .50 steel could have been chosen with the 500 lb. load.

The law holds true for any load value on the instrument. With similar reasoning—where shallow depths are desired—a larger area of steel may be chosen and, a correspondingly smaller depth. The resulting $f_s$ will be read on slide No. 1 opposite the given $f_c$; for example, for a 500 lb. load a .65 $A_s$ and 7″ D may be correctly chosen; or a .7 A$_s$ and a 6.5″ D; etc.

*Example 3:—Investigation or design problem*

Assume, as another demonstration, we have the following investigation, or design problem: Find the most economical steel area of the reinforcement to be placed in a 26″ (total depth) beam of breadth $b=14″$. Also the resulting concrete compressive stress ($f_c$); the unit shearing stress and the required perimeter of the steel, etc.

Given—maximum allowable $f_s$ = 18000 lbs. per sq. in.
maximum allowable $f_c$ = 700 lbs. per sq. in.
BM coefficient = $\frac{1}{12}$
$l$ = 10 ft.
Uniform load $L$ = 7500 lbs. per ft. (equals total superimposed load) A$_s$—required $f_c$—required.

*Directions:*—(See setting shown in Fig. 1.)

(1) Set $\frac{1}{12}$ on slide No. 4 opposite 10 ft. on slide No. 3.

(2) Set 7500 on slide No. 4 opposite 26″ on slide No. 2 (get this setting by moving slide No. 3 and No. 4 together).

(3) On slide No. 2 read $f_c = 640$ opposite $b = 14″$ (on slide No. 3).

(4) On slide No. 1 (re: Beams and girders $f_s = 18000$) place 14″ opposite $f_c = 640$ (on slide No. 2).

(5) Read A$_s = (2.1-)$—on slide No. 1 and opposite $L = 7500$ and $D = 26″$.

(6) The $v$, $\Sigma o$ etc. are determined as before.

*Example 4;—Girder design Case 5*

Now suppose the following is to be designed: A three equal-span girder, supported at the ends and having equal concentrated loads (P) of 10,000 lbs. positioned at ⅓ points on each span. The span lengths are 24 ft. breadth of girder to be 12″; $f_s = 18000$, $f_c = 700$. The spans are semi-continuous. Solution: (See Fig. 1). Instead of using span scale 38 as before, span scale 45 is to be used; for, the moment equation due to the superimposed loads takes the form:

$$M = \frac{1}{M'} Pl;$$

that is—a coefficient of $l$ instead of $l^2$ is being considered. Then, opposite 24 ft. on scale 45 it is only necessary to set the graduation that indicates 1/3 points for semicontinuous (s. c.) spans and, the total bending (or resisting) moment, the depth etc. may be read opposite any P on load scale 40. Thus, when P = 10,-000 lbs. M = 85,300 lb.-ft. (which is the total moment due to the concentrated loading and to the dead load of the designed member), D = 29.5″, A$_s$ = 2.4 etc.

The total shears at different sections will now be determined. At the different sections, the coefficients $\left(\frac{1}{V'}\right)$ of P will have different values; for example, at the left of the second support $\frac{1}{V'} = 1.27$. This value, as chosen on scale 78, is set opposite the V graduation (70) (in every case) and the total shear (V), in lbs. may be read on scale 59 opposite P on the load scale; the procedure is identical for any other coefficient $\left(\frac{1}{V'}\right)$.

It is strongly emphasized that the factors dealt with on the instrument are identical with the usual ones encountered in design calculations, and the directions given for the mode of operation of the instrument consists merely of a logical step by step reasoning as would be the case were one to make a longhand calculation. This is pointed out so that it may be clearly understood that these directions do not comprise a series of complicated arbitrary rules (due to inherent features of the rule) which must be learned by the operator. The instrument merely is a means of saving the time of making the actual calculations by the usual method. Obviously, therefore, its proper use also eliminates the chances of error.

The modified construction illustrated in Figs. 5 and 6 operates in the same manner as the construction of Figs. 1 to 4, inclusive. It is constructed of a series of discs and a plate or base upon which the discs are pivotally mounted. The base 10′ corresponds to slide 10—slide No. 1; disc 13′ corresponds to slide 13—slide No. 2; disc 17′ corresponds to slide 17—slide No. 3; and disc 20′ corresponds to slide 20—slide No. 4. The scales on the discs and base bear reference characters with primes corresponding to the reference characters on the construction of Figs. 1 to 4 and the scales identified thereby are the same in function as the other scales. If desired, this form of instrument may be provided with shear and other scales not illustrated in Figs. 5 and 6 corresponding to those of the other instrument.

*Remarks*

The graduations 37 on slide No. 3 are drawn on a small scale, and consequently the three ciphers are omitted on the values of $f_s$ given. In other words, the $f_s$ values as appear upon this scale 37 are given in thousands of pounds per sq. in.

Referring now to the graduation 30 on slide No. 1, particularly the portion used for beams and girders (see Fig. 1), where $f_s$ is taken at 16,000 lbs. per sq. in., the $b$ graduations are found on the upper portion of the scale, and where the $f_s$ value is taken at 18,000 lbs. per sq. in., the $b$ graduations appear on the lower part of this scale.

The $f_s$ graduations on this scale 30 are inclined and marked in inches ($b$) of width of the beam or girder under consideration. Thus, the $f_s$ graduation marked 6 inches indicates a certain point on the upper 16,000 $f_s$ line, while the opposite end of this same graduation points to a different point on the 18,000

$f_s$ line. Now, in case it should be desired to use an $f_s$ value between 16,000 and 18,000 as, for example, 17,000, then the scale point would be a point approximately midway between these two points on these two scales.

For convenient reference, a table may be put on the back of slide No. 1, which lists the different bar combinations and their perimeters for any areas, thereby making the instrument a complete source of general design information.

It is to be noted that this slide rule can be made to give a portion of the information that it does, without sacrificing accuracy: by the use of a lesser number of slides. Thus, for example, a computing instrument for slabs embodying the present invention may be made using two slides provided only one $f_s$, and $f_c$ and one $b$ is used. This will be plain by observation of Fig. 1, if it is assumed that slides 1, 2 and 3 stand fast and slide 4 is moved within slide 3. Then all computations for slabs may be made on the basis of the assumed values of the three variables mentioned, which then stand fast. Such an instrument would have the bending moment scale, depth of concrete and the area of steel all engraved on one surface. Similarly, a computing instrument for beams and girders could be made of two slides. It is to be observed, of course, that in one aspect the three slides retained may be regarded as a case and a single slide within it.

It is also to be noted that the several slides may be arranged on circles without any departure from the invention. Consequently, the claims are to be understood as reading on either rectilinear slides or rotary slides.

Referring to the correction fractions: these could be eliminated by making the corrections or interpolations by additional scales; but this would be less practical because the corrections are so comparatively simple.

It should be particularly observed that the construction principle of the slide rule established by the invention possesses certain outstanding practical features: viz., the fabrication is extremely simple and thus, inexpensive, it has numerous available scale-bearing surfaces, compactness, ease of manipulation, adaptability to use of a plurality of slides which may be interchanged at will for different purposes.

The slides conform to the contour of adjacent slides and the inturned lips provide ideal smooth-bearing surfaces between the slides.

While in its broader aspects the present invention contemplates a calculating instrument for general use in the solution of equations of the types herein employed specifically for the purpose of calculating the characteristics of concrete structures, and while the most important use of the invention will be made in the computation of such concrete structures, still it is to be understood that the invention as defined in certain of the claims is not limited to such use.

It is to be understood that the formulæ herein referred to may be changed in any way without departing from the invention so long as the change does not alter the general scheme established by the invention, that is to say, the scheme of the scale derivations and combinations.

In the claims the term factor is to be understood as being a variable factor or a factor to which may be assigned any variable quantities or a factor composed of variables, and obviously the term factor necessarily implies any function of the factor. So also, when the various scales are referred to, it is to be understood that the reference is to the scale or a function of the scale. The term correct as used in the claims is intended to imply that the result indicated is correct within practical limitations. The term scale is to be understood as meaning a series of specially derived graduations representing any values of the variable factor. Where the factor L is used, the factor P may be used in its stead with correctness; so also with respect to the factor M, for which V may be used in its place in which case the same scale represents either L or P, or either M or V values, as the case may be; with respect to the D scale, $d$ values may be read from it if desired.

A smaller number of scales may be employed if it is desired to reduce the number of operations or computations to a smaller number, or to reduce the number of factors employed in a given computation.

I claim:

1. A calculating instrument for use in making computations for the design of reinforced concrete beams having, in combination, four nested slides comprising slide No. 1 provided with a scale of graduations of permissible reinforcement stresses and assumed breadths, slide No. 2 provided with a co-operating scale of graduations of permissible concrete compressive stresses co-operating with the reinforcement scales of slide No. 1, and with a second set of concrete compressive stresses, slide No. 3 provided with a scale of concrete breadths co-operating with the second concrete compressive scale of slide No. 2 and with a span scale and slide No. 4 provided with a scale of bending moment coefficients, co-operating with the span scale of slide No. 3, said slide No. 4 being also provided with a scale of superimposed loads, said slide No. 3 being also provided with a scale of total bending moments, said slide No. 2 being also provided with a scale of depths of concrete, and said slide No. 1 being also provided with a scale of reinforcement sectional areas and with a scale of reinforcement weights in pounds per lineal foot, said additional scales of loads, bending moments, depths of concrete, cross-section of reinforcement and weights of reinforcement per lineal foot all co-operating together, the arrangement being such that when the slides are set so that the given breadth on slide No. 1 corresponds with the given permissible concrete compressive stress on slide No. 2, and slide No. 3 is set with the assumed breadth of concrete opposite the assumed concrete compressive stress of slide No. 2, and slide No. 4 is set with the assumed bending moment coefficient opposite the assumed length of span on the scale of slide No. 3, then the last five-named scales are thereby so set that with any assumed load, the total bending moment, the depth of concrete, the cross-sectional area of the reinforcement, and the weight per lineal foot of such reinforcement read directly across all five scales.

2. A calculating instrument for girders as defined in claim 1 in which slide No. 3 is provided with a second span scale and slide No. 4 is provided with a second scale of bending moment coefficients, with particular divisions marked off for concentrated loadings at various points, co-operating with said second span scale on slide No. 3.

3. A calculating instrument for use in making computations for the design of reinforced concrete slabs having, in combination, four slides comprising slide No. 1 provided with a scale of permissible reinforcement stresses, slide No. 2 provided with a co-operating scale of permissible concrete compressive stresses, and with a second set of concrete compressive stresses, slide No. 3 provided with a scale of steel tensile stresses co-operating with the second set of concrete compressive stresses of slide No. 2, and also provided with a scale of spans, and slide No. 4 provided with a scale of bending moment coefficients co-operating with the span scale on slide No. 3, said slide No. 4 being also provided with a scale of superimposed loads, slide No. 2 being also provided with a scale of concrete depths, and No. 1 being also provided with a scale of reinforcement cross-sectional areas and with a scale of weights per foot of reinforcement, the arrangement being such that when slide No. 2 is set with respect to slide No. 1 so that the assumed concrete compressive stress is opposed to the assumed reinforcement tensile stress of the scale of slide No. 1, and when slide No. 3 is set with the assumed steel reinforcement tensile stress opposite the assumed concrete compressive stress of the scale of slide No. 2, and when slide No. 4 is set with the assumed bending moment coefficient opposite the assumed span on the span scale of slide No. 3, then readings may be taken directly across the other four scales showing for any assumed load, the depth of concrete, the total cross-sectional area of the reinforcement, and the weight per foot of such reinforcement.

4. A calculating instrument for use in making computations for the design of reinforced concrete structures comprising three slides, one slide (No. 2) being provided with a scale of concrete compressive stresses, a second slide (No. 3) provided with a scale of steel tensile stresses co-operating with the first named scale, and also provided with a scale of spans, and a third slide (No. 4) provided with a scale of bending moment coefficients co-operating with the span scale on the second slide (No. 3), and said third slide (No. 4) being also provided with a scale of horizontal spacings of web-reinforcing members, a scale of minimum lengths of embedment of bars for bond, a scale of the sum of perimeters of the bars in one set, and a scale of the allowable unit shearing stresses on the concrete and steel, and said first slide (No. 2) being also provided with a scale of depths of concrete, a scale of maximum horizontal spacing of web reinforcing members, and a scale of the number of cubic yards of concrete per 100 square feet of horizontal surface, the arrangement being such that when the second scale (No. 3) is set with the assumed steel tensile stress against the assumed concrete compressive stress of the scale on the first slide (No. 2), and the third slide (No. 4) is set with the assumed bending moment coefficient opposite the assumed span, then the remaining seven scales will all read each with respect to the others for the given conditions in terms of the units of the several scales.

5. A calculating instrument for use in making computations for the design of reinforced concrete structures having, in combination, four co-operating slides, slide No. 1 being provided with an $f_s$, $b$ scale, slide No. 2 being provided with two $f_c$ scales, one arranged to co-operate with the $f_s$ $b$, scale of slide No. 1, slide No. 3 provided with a $b$ scale to co-operate with the second $f_c$ scale of slide No. 2, and also provided with an $l$ scale, and slide No. 4 provided with a $\frac{1}{M'}$ scale arranged to co-operate with the $l$ scale of slide No. 3, said slide No. 4 being also provided with a P scale, slide No. 3 being also provided with an M scale, slide No. 2 being also provided with a D scale, and slide No. 1 being also provided with an $A_s$ scale and with a W' scale, said P, M, D, $A_s$ and W' scales all reading each with respect to the others for any given load at a given setting of the slides for an assumed $f_s b$; $f_c$; $b$; $l$ and $\frac{1}{M'}$ values.

6. A calculating instrument for use in making computations for the design of reinforced concrete structures comprising three slides having co-operating scales, the first slide (No. 2) being provided with an $f_c$ scale, the second slide (No. 3) with a co-operating $f_s$ scale and with an $l$ scale, and the third slide (No. 4) provided with a $\frac{1}{M'}$ scale co-operating with the $l$ scale of the second slide, said third slide being also provided with a superimposed load scale, the second slide being also provided with an M scale, and the first slide being also provided with a D scale, said last-named three scales reading directly across each other showing for any given load, total bending moment and the depth of concrete when the assumed $f_c$ graduation of the first slide is set opposite the assumed $f_s$ graduation of the second slide, and the assumed $\frac{1}{M'}$ graduation is set opposite the assumed $l$ graduation of the second slide, so that the load, total bending moment and depth of concrete will read directly for any load with such assumed $f_s$, $f_c$ $\frac{1}{M'}$ and $l$ graduations.

7. A calculating instrument for use in making computations for the design of reinforced concrete structures having, in combination, a series of scales representing L, M, D, $A_s$ and W' arranged in a certain position with respect to each other, and a set of $f_s$, $f_c$, $b$, $l$ and $\frac{1}{M'}$ scales arranged in certain positions with respect to each other, such that the correct relative values of the factors L, M, D, $A_s$ and W' may be read over their entire scale range opposite any assumed variable of any one of these factors.

8. A calculating instrument for use in making computations for the design of reinforced concrete structures having, in combination, a plurality of scales movable with respect to each other to represent a combination of $f_s$, $f_c$, P, $b$, $l$ and $\frac{1}{M'}$ values, such scales being connected with a second set of scales, namely scales representing L, M, D and $A_s$, so that when the former set of scales are moved, the second set of scales will be moved with relation to each other so that the latter scales always read correctly with respect to each other over their entire ranges for any setting or interpolation as may be obtained by the relative motion of the former scales.

9. A calculating instrument for use in making computations for the design of reinforced concrete structures having, in combination, a set of scales representing $f_s$, $f_c$, $l$ and $\frac{1}{M'}$ representing factors indicated by the graduations, and a set of scales representing D, $A_s$, W', M, L, $s$, Q, $v$, $\Sigma o$, $l$ and $s_1$ the arrangement and connections between the several scales being such that when the former set of scales are correctly set the latter set of scales will correctly read the values of the quantities indicated by them thruout their entire range.

10. A calculating instrument for use in making computations for the design of reinforced concrete structures having, in combination, a set of scales graduated to represent combinations of the factors $f_c$, $f_s$, $l$ and $\frac{1}{M'}$, and a set of scales representing $v$, $\Sigma o$, $l'$, $s_1$ and D, so connected that when the scales of the former set are moved with relation to each other, the scales of the latter set are also moved with relation to each other so that the latter scales read correctly with respect to each other for any setting or interpolation as may be obtained by the relative motion of the former scales.

11. A calculating instrument for use in making computations for the design of reinforced concrete structures having, in combination, two slides one being provided with a single graduation, the other being provided with a co-operating scale representing $\frac{1}{V'}$ graduations, the second slide being also provided with a scale of P graduations and the first slide having a co-operating scale of V graduations, for calculating total end shear.

12. A calculating instrument for use in designing or investigating concrete structures; such as beams, girders or slabs, having, in combination, a first slide (No. 1) provided with an $f_s$ graduated scale; a second slide (No. 2) provided with an $f_c$ graduated scale opposed in position to the $f_s$ scale and with a second $f_s$ graduated scale; a third slide (No. 3) provided with two parallel graduated scales, one of girder widths and the other of girder lengths opposed to the second set of $f_s$ graduations of the second slide (No. 2); a fourth slide (No. 4) provided with a scale of $\frac{1}{M'}$ graduations opposed to the girder length graduations of the third slide (No. 3), and also provided with a scale of L or P graduations; the third slide (No. 3) being provided with a scale of M graduations opposed to the scale of L or P graduations of the fourth slide (No. 4); the second slide (No. 2) being provided with a scale of D graduations; the first slide (No. 1) being provided with a scale of $A_s$ graduations and a scale of W' graduations, constructed and arranged for use as described.

13. A calculating instrument, as defined in claim 12, in which slide No. 3 is provided with a single shear graduation and slide No. 4 is provided with a scale of $\frac{1}{V'}$ graduations constructed and arranged for use in checking shear stresses as described.

In testimony whereof I have signed my name to this specification.

FRANK V. BECKER.